(12) United States Patent
Petway et al.

(10) Patent No.: US 11,104,792 B2
(45) Date of Patent: Aug. 31, 2021

(54) ADDUCTS AND USES THEREOF

(71) Applicant: Huntsman Advanced Materials Americas LLC, The Woodlands, TX (US)

(72) Inventors: Lorenzo Neil Petway, Spring, TX (US); Tresha Ann Bennett, Kingwood, TX (US)

(73) Assignee: HUNTSMAN ADVANCED MATERIALS AMERICAS LLC, The Woodlands, TX (US)

( * ) Notice: Subject to any disclaimer, the term of this patent is extended or adjusted under 35 U.S.C. 154(b) by 22 days.

(21) Appl. No.: 16/325,772

(22) PCT Filed: Aug. 18, 2017

(86) PCT No.: PCT/US2017/047484
§ 371 (c)(1),
(2) Date: Feb. 15, 2019

(87) PCT Pub. No.: WO2018/035397
PCT Pub. Date: Feb. 22, 2018

(65) Prior Publication Data
US 2019/0211202 A1    Jul. 11, 2019

Related U.S. Application Data

(60) Provisional application No. 62/377,083, filed on Aug. 19, 2016.

(51) Int. Cl.
| | | |
|---|---|---|
| C08L 63/00 | (2006.01) |
| C08G 59/28 | (2006.01) |
| C08G 59/50 | (2006.01) |
| C09D 163/00 | (2006.01) |
| C09J 163/00 | (2006.01) |
| C08G 59/68 | (2006.01) |

(52) U.S. Cl.
CPC .............. *C08L 63/00* (2013.01); *C08G 59/28* (2013.01); *C08G 59/50* (2013.01); *C09D 163/00* (2013.01); *C09J 163/00* (2013.01); *C08G 59/686* (2013.01)

(58) Field of Classification Search
CPC ........ C08L 63/00–10; C09D 163/00–10; C09J 163/00–10; C08G 59/14–1494; C08G 59/32
See application file for complete search history.

(56) References Cited

U.S. PATENT DOCUMENTS

| | | | |
|---|---|---|---|
| 2,909,448 A | 10/1959 | Schroeder et al. | |
| 2,951,825 A | 9/1960 | Reinking et al. | |
| 4,348,505 A | 9/1982 | Benedetto et al. | |
| 4,560,739 A | 12/1985 | Zahir | |
| 5,338,568 A * | 8/1994 | Lohnes | C04B 41/009 427/136 |
| 5,639,413 A | 6/1997 | Crivello | |
| 5,972,563 A | 10/1999 | Bettina et al. | |
| 2014/0128503 A1* | 5/2014 | Karl | C07D 303/28 523/400 |

FOREIGN PATENT DOCUMENTS

WO    2015175583 A    11/2015

* cited by examiner

*Primary Examiner* — Kregg T Brooks
(74) *Attorney, Agent, or Firm* — Huntsman Advanced Materials Americas LLC; Lewis D. Craft

(57) ABSTRACT

The present disclosure provides an adduct comprising the reaction product of a residual epoxy oligomer product and a reactive compound having at least two reactive hydrogens where the residual epoxy oligomer product was obtained from a process for producing an aromatic epoxy resin. The adduct may be used in a variety of ways, such as a curing agent in a curable system containing a curable resin.

11 Claims, No Drawings

ADDUCTS AND USES THEREOF

CROSS-REFERENCE TO RELATED APPLICATIONS

This application claims the benefit of U.S. Provisional Patent Application Ser. No. 62/377,083, filed Aug. 19, 2016, the entire disclosure of which is incorporated herein by reference

STATEMENT REGARDING FEDERALLY SPONSORED RESEARCH OR DEVELOPMENT

Not applicable.

FIELD OF INVENTION

This disclosure relates to an adduct obtained from the reaction of a residual epoxy oligomer product and a reactive compound having two or more reactive hydrogen atoms. The adduct may be combined with a curable resin to form a curable system which may be used in a variety of applications, for example, as an adhesive, sealant, coating, structural composite or encapsulating system for electronic and electrical components.

BACKGROUND

During the manufacture of polyfunctional glycidyl compounds of aminophenols via glycidylation of aromatic hydroxyl and amino containing materials using epichlorohydrin or glycerol 1,3-dichlorohydrin, it is difficult, if not impossible, to drive glycidylation to full conversion. Therefore, a significant quantity of residue material containing undesirable co-products is produced. While various separation methods, such as distillation, may be used to remove the desired polyfunctional glycidyl compounds from the residue material containing the undesirable co-products, no satisfactory solution exists for handling and using the resulting separated and isolated residue material since it is generally unstable at ambient conditions and, upon standing, can form an infusible solid through a self-catalyzed homopolymerization reaction. The residue is then considered solid waste and disposed as such. Instead of disposing this residue material, it would be desirable to develop ways to utilize the residual material as a raw material in the production of reaction products through oxirane groups as is typically done with industry standard epoxy resins.

SUMMARY

The present disclosure is directed to an adduct which comprises the reaction product of (A) a residual epoxy oligomer product and (B) a reactive compound having two or more reactive hydrogen atoms such that the resulting adduct may be used as a curing agent in connection with curable resins.

In another aspect, there is provided a process for preparing the adduct by reacting (A) the residual epoxy oligomer product with (B) the reactive compound having two or more reactive hydrogen atoms wherein the residual epoxy oligomer product is co-produced in the production an aromatic epoxy resin formed by (i) the reaction of an aromatic hydroxyl and amine containing material with an epihalohydrin or glycerol dihalohydrin, and a Lewis acid catalyst and subsequently treating with a base; or, (ii) the reaction of an aromatic hydroxyl and amine containing material with an epihalohydrin or glycerol dihalohydrin in the presence of a base and a phase transfer catalyst.

In another aspect, the adduct of the present disclosure may be blended with one or more epoxy compounds and, optionally, a curing agent and/or a catalyst to form a curable system.

The curable system according to the present disclosure may be used in a variety of applications such as in a coating, adhesive, sealant, or structural composite for use in various industries, such as in the aerospace, automotive or electronic industries.

DETAILED DESCRIPTION

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e., to at least one) of the grammatical object of the article. By way of example, "an epoxy oligomer" means one epoxy oligomer or more than one epoxy oligomer. The phrases "in one aspect," "according to one aspect," and the like generally mean the particular feature, structure, or characteristic following the phrase is included in at least one aspect of the present disclosure, and may be included in more than one aspect of the present disclosure. Importantly, such phrases do not necessarily refer to the same aspect. If the specification states a component or feature "may", "can", "could", or "might" be included or have a characteristic, that particular component or feature is not required to be included or have the characteristic.

The term "residual epoxy oligomer product" herein means an oligomeric fraction comprising an epoxy oligomer and which is co-produced during a process for producing an aromatic epoxy resin product wherein the mixture of the co-produced oligomeric fraction and aromatic epoxy resin product is subjected to a subsequent separation process such that the co-produced oligomeric fraction is substantially separated and isolated from the aromatic epoxy resin product. The separation process can be carried out by known means, such as, for example, by a distillation unit operation. Once the co-produced oligomeric fraction has been separated from the aromatic epoxy resin product, for example by distillation, the resulting separated/isolated oligomeric fraction, typically the residual bottoms material of a distillation process, comprises the residual epoxy oligomer product useful in the present disclosure.

The term "epoxy oligomer" means a compound having at least one epoxy group.

The term "adduct" is intended to mean a chemical species AB of which each molecular entity is formed by direct combination of at least two distinct molecular entities A and B.

According to one aspect, there is provided an adduct obtained from the reaction of (A) a residual epoxy oligomer product; and (B) a reactive compound having two or more reactive hydrogen atoms per molecule where the reactive hydrogen atoms are reactive with epoxide groups.

In general, the residual epoxy oligomeric product (A) used as a reactant may be obtained as a second product stream during a process for the production of an aromatic epoxy resin (first product stream) that includes: (i) reacting an aromatic hydroxyl and amine containing material with an epihalohydrin or glycerol dihalohydrin, and a Lewis acid catalyst and subsequently treating with a base; or, (ii) reacting an aromatic hydroxyl and amine containing material with an epihalohydrin or glycerol dihalohydrin in the presence of a base and a phase transfer catalyst. The process may optionally include the use of one or more solvents which are substantially inert to reaction with the reactants employed, the intermediates formed and product produced. In some aspects, the epihalohydrin may be epichlorohydrin or epibromohydrin, the glycerol dihalohydrin may be glycerol 1,3-dichlorohydrin and the base may be sodium hydroxide, barium hydroxide, potassium carbonate and the like. Examples of phase transfer catalysts include tetramethylammonium chloride, a tertiary amine or a quaternary ammonium base.

After the epoxidation reaction, the residual epoxy oligomer product (second product stream) is separated and isolated from the aromatic epoxy resin product (first product stream) by known means, such as, for example, by a distillation unit operation. In one particular aspect, the residual epoxy oligomer product may be separated from the aromatic epoxy resin product after the substantial removal by distillation of: (1) light components, such as, for example, solvents, if any; unreacted epihalohydrin, and/or glycerol dihalohydrin; (2) unreacted aromatic hydroxyl and amine containing material, if any; and, (3) the aromatic epoxy resin product, such as, for example, triglycidyl p-aminophenol, such that the residual epoxy oligomeric product remaining contains no more than 10 percent by weight, or no more than 5 percent by weight, or even no more than 1 percent by weight, or even still no more than 0.5 percent by weight of the aromatic epoxy resin product (3), based on the total weight of the residual epoxy oligomer product.

In one aspect, the aromatic hydroxyl and amine containing material is a compound represented by the formula (I)

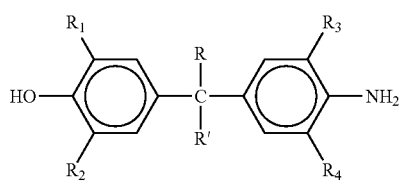

(I)

where each of R and R' independently is hydrogen, a $C_1$-$C_6$ alkyl, phenyl, cyclohexyl or cyclopentyl and each of $R_1$, $R_2$, $R_3$, and $R_4$ independently is hydrogen, halogen or a $C_1$-$C_6$ alkyl.

In some aspects, each of R and R' independently is hydrogen or methyl. In other aspects each of $R_1$, $R_2$, $R_3$, and $R_4$ independently is hydrogen, chlorine, bromine or an alkyl group having up to 4 carbon atoms.

The compounds of formula (I) are known compounds and may be obtained by reacting a bisphenol having a formula

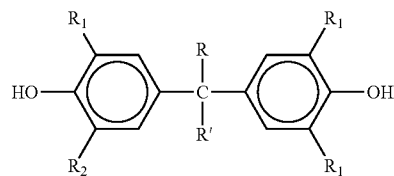

where R, R', $R_1$ and $R_2$ are defined above, with an unsubstituted or substituted aniline having the formula

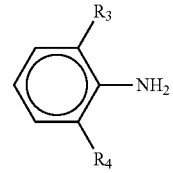

where $R_3$ and $R_4$ are defined above.

Examples of bisphenol compounds which may be used include, but are not limited to, bis(4-hydroxyphenyl)methane (bisphenol F), 2,2-bis(4-hydroxyphenyl)propane (bisphenol A), 2,2-bis(4-hydroxy-3,5-dibromophenyl)propane (tetrabromobisphenol A), 2,2-bis(3-methyl-4-hydroxyphenyl)propane, 2,2-bis(3-chloromethyl-4-hydroxyphenyl)propane, bis(3-tert-butyl-4-hydroxyphenyl)methane and 2,2-bis(3-bromo-4-hydroxyphenyl)propane. Examples of aniline compounds which may be used include, but are not limited to, aniline, 2,6-diethylaniline, 2-isopropyl-6-methyl aniline, 2,6-dichloroaniline, o-chloroaniline, o-bromoaniline and o-toluidine.

In another aspect, the aromatic hydroxyl and amine containing material is a compound represented by the formula (Ia)

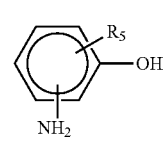

(Ia)

where the amino group is at the m, o or p position and $R_5$ is hydrogen, a $C_1$-$C_5$ alkyl, a $C_6$-$C_{12}$ aryl, at least a $C_7$ alkaryl, halogen or a $C_1$-$C_5$ alkoxy.

Examples of compounds of formula (Ia) include, but are not limited to, 2-aminophenol, 3-aminophenol, 4-aminophenol, 2-phenyl-4-aminophenol, 2-methyl-4-aminophenol, 3-methyl-4-aminophenol, 2-chloro-4-aminophenol, 3-chloro-4-aminophenol, 2-amino-4-ethylphenol, 5-amino-2-methylphenol and 5-amino-2-ethylphenol.

According to one aspect, the residual epoxy oligomer product, once separated and isolated from the aromatic epoxy resin product, may be stored in any suitable container at a temperature of about 0° C. or less until its desired use. In other aspects, the residual epoxy oligomer product, once separated and isolated from the aromatic epoxy resin product, may be contacted with component (B) comprising a reactive compound having two or more reactive hydrogen atoms per molecule and allowed to react to form the adduct.

The residual epoxy oligomer product, depending on the chemistry and processing used in the epoxidation reaction and separation/isolation above, may include one or more of the following epoxy oligomer compounds (II) (VI):

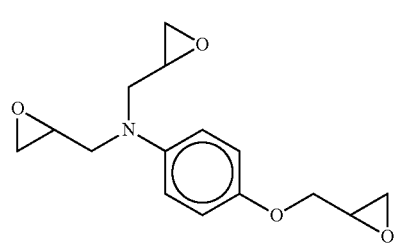

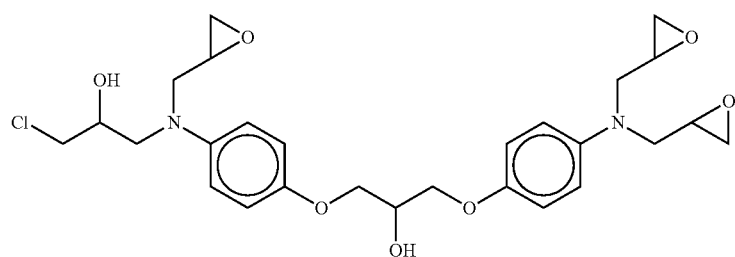

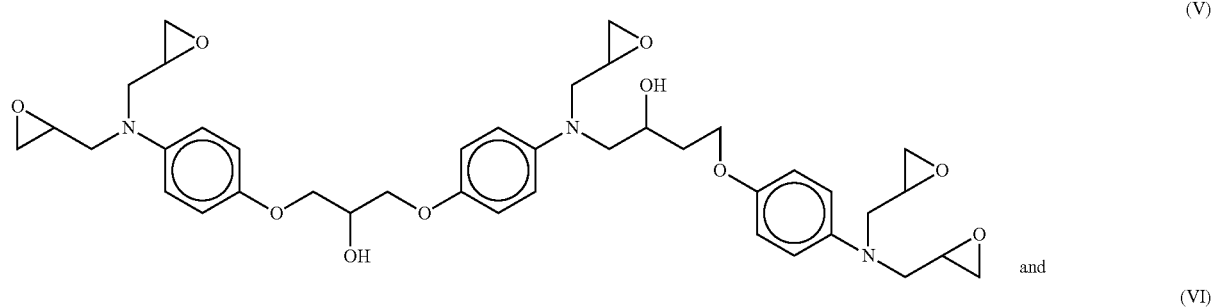

and

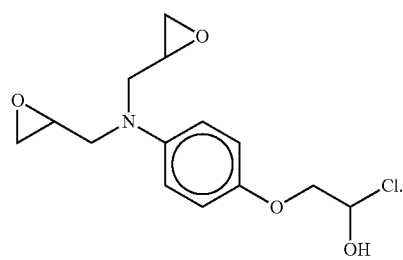

In one aspect, the residual epoxy oligomer product may include epoxy oligomer (II) in an amount ranging between about 10% by weight to about 35% by weight, or between about 15% by weight to about 30% by weight, or even between about 20% by weight to about 25% by weight, based on the total weight of the residual epoxy oligomer product.

In another aspect, the residual epoxy oligomer product may include epoxy oligomer (III) in an amount ranging between about 35% by weight to about 70% by weight, or between about 40% by weight to about 65% by weight, or even between about 45% by weight to about 60% by weight, based on the total weight of the residual epoxy oligomer product.

In still another aspect, the residual epoxy oligomer product may include epoxy oligomer (IV) in an amount ranging between about 1% by weight to about 20% by weight, or between about 2.5% by weight to about 15% by weight, or even between about 5% by weight to about 10% by weight, based on the total weight of the residual epoxy oligomer product.

In yet another aspect, the residual epoxy oligomer product may include epoxy oligomer (V) in an amount ranging between about 1% by weight to about 20% by weight, or between about 2.5% by weight to about 15% by weight, or even between about 5% by weight to about 10% by weight, based on the total weight of the residual epoxy oligomer product.

In still yet another aspect, the residual epoxy oligomer product may include epoxy oligomer (VI) in an amount of less than about 3% by weight, or less than about 1% by weight, or even less than about 0.5% by weight, based on the total weight of the residual epoxy oligomer product.

In a further aspect, the residual epoxy oligomer product may include an epoxy oligomer having a molecular weight greater than about 750 g/mol in an amount of less than 10% by weight, or less than about 5% by weight, or even less than about 2% by weight, and even less than about 1% by weight, or still even less than about 0.5% by weight, based on the total weight of the residual epoxy oligomer product.

In one particular aspect, the residual epoxy oligomer product includes (a) epoxy oligomer (II) in an amount ranging between about 10% by weight to about 35% by weight, (b) epoxy oligomer (III) in an amount ranging between about 35% by weight to about 70% by weight, (c)

epoxy oligomer (IV) in an amount ranging between about 1% by weight to about 20% by weight, (d) epoxy oligomer (V) in an amount ranging between about 1% by weight to about 20% by weight, and (e) epoxy oligomer (VI) in an amount of less than about 3% by weight, based on the total weight of the residual epoxy oligomer product. In another aspect, the residual epoxy oligomer product further comprises an epoxy oligomer having a molecular weight greater than about 750 g/mol in an amount of less than 10% by weight, based on the total weight of the residual epoxy oligomer product.

In another particular aspect, the residual epoxy oligomer product includes (a) epoxy oligomer (II) in an amount ranging between about 20% by weight to about 25% by weight, (b) epoxy oligomer (III) in an amount ranging between about 45% by weight to about 60% by weight, (c) epoxy oligomer (IV) in an amount ranging between about 5% by weight to about 10% by weight, (d) epoxy oligomer (V) in an amount ranging between about 5% by weight to about 10% by weight, and (e) epoxy oligomer (VI) in an amount of less than about 1% by weight, based on the total weight of the residual epoxy oligomer product. In another aspect, the residual epoxy oligomer product further comprises an epoxy oligomer having a molecular weight greater than about 750 g/mol in an amount of less than 10% by weight, based on the total weight of the residual epoxy oligomer product.

The component (B) used in the present disclosure to react with the residual epoxy oligomer product (A) to form the adduct comprises a reactive compound having two or more reactive hydrogen atoms per molecule. The reactive hydrogen atoms are reactive with epoxide groups, such as those epoxide groups contained in the epoxy oligomer compounds. The term "reactive hydrogen atom" as used herein means that the hydrogen atom is reactive with an epoxide group. The reactive hydrogen atom differs from other hydrogen atoms including those hydrogen atoms which are non-reactive with epoxide groups in the reaction of forming the adduct but may be reactive with epoxide groups in a later process of curing the adduct with one or more epoxy resins.

Hydrogen atoms can be non-reactive with the epoxide groups in the process of forming the adduct, when there are other functional groups which are much more reactive with the epoxide groups under reaction conditions used, but reactive in a later process of curing the adduct with the epoxy resin. For example, a reactive compound (B) may have two different functional groups each bearing at least one reactive hydrogen atom, with one functional group being inherently more reactive with an epoxide group than the other under the reaction conditions used. These reaction conditions may include the use of a catalyst which favors a reaction of the reactive hydrogen atom(s) of one functional group with an epoxide group over a reaction of the reactive hydrogen atom(s) of the other functional group with an epoxide group.

Other non-reactive hydrogen atoms may also include hydrogen atoms in the secondary hydroxyl groups which form during an epoxide ring opening reaction in the process of producing the adduct.

The component (B) comprising the reactive compound having two or more reactive hydrogen atoms per molecule may further comprise aliphatic, cycloaliphatic or aromatic groups within the reactive compound (B) structure. The aliphatic groups may be branched or unbranched. The aliphatic or cycloaliphatic groups may also be saturated or unsaturated and may comprise one or more substituents which are inert (not reactive) in the process of preparing the adduct of the present disclosure including the reactants and the products. The substituents may be attached to a terminal carbon atom or may be between two carbon atoms, depending on the chemical structures of the substituents. Examples of such inert substituents include halogen atoms, such as chlorine or bromine, nitrile, nitro, alkyloxy, keto, ether (—O—), thioether (—S—) or tertiary amine. The aromatic ring, if present within the reactive compound (B) structure, may comprise one or more heteroatoms such as N, O, S and the like.

Examples of the reactive compound (B) may include compounds such as di- and polyphenols, di- and polycarboxylic acids, di- and polymercaptans, di- and polyamines, primary monoamines, sulfonamides, aminophenols, aminocarboxylic acids, phenolic hydroxyl containing carboxylic acids, sulfanilamides, and any combination of any two or more of such compounds.

Examples of the di- and polyphenols include, but are not limited to, 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3',5,5'-tetrachlorobisphenol A; 3,3'-dimethoxybisphenol A; 3,3',5,5'-tetramethyl-4,4'-dihydroxydiphenyl; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; 1,1-bis(4-hydroxyphenyl)cyclohexane; 1,4-dihydroxy-3,6-dimethylbenzene; 1,4-dihydroxy-3,6-dimethoxybenzene; 1,4-dihydroxy-2-tert-butylbenzene; 1,4-dihydroxy-2-bromo-5-methylbenzene; 1,3-dihydroxy-4-nitrophenol; 1,3-dihydroxy-4-cyanophenol; tris(hydroxyphenyl)methane; dicyclopentadiene or an oligomer thereof and phenol or substituted phenol condensation products; and any mixture thereof.

Examples of di- and polycarboxylic acids include, but are not limited to, terephthalic acid; isophthalic acid; dicyclopentadienedicarboxylic acid; tris(carboxyphenyl)methane; 4,4'-dicarboxydiphenylmethane; 1,4-cyclohexanedicarboxylic acid; 1,6-hexanedicarboxylic acid; 1,4-butanedicarboxylic acid; 1,1-bis(4-carboxyphenyl)cyclohexane; 3,3',5,5'-tetramethyl-4,4'-dicarboxydiphenyl; 4,4'-dicarboxy-alpha-methylstilbene; 1,4-bis(4-carboxyphenyl)-trans-cyclohexane; 1,1'-bis(4-carboxyphenyl)cyclohexane; 1,3-dicarboxy-4-methylbenzene; 1,3-dicarboxy-4-methoxybenzene; 1,3-dicarboxy-4-bromobenzene; and any combination thereof.

Examples of di- and polymercaptans include, but are not limited to, bis(2-mercaptoethyl)sulfide; tris(mercaptophenyl)methane; 1,3-benzenedithiol; 1,4-benzenedithiol; 4,4'-dimercaptodiphenylmethane; 4,4'-dimercaptodiphenyl oxide; 4,4'-dimercapto-alpha-methylstilbene; 3,3',5,5'-tetramethyl-4,4'-dimercaptodiphenyl; 1,4-cyclohexanedithiol; 1,6-hexanedithiol; 2,2'-dimercaptodiethylether; 1,2-dimercaptopropane; 1,1-bis(4-mercaptophenyl)cyclohexane; and any combination thereof.

Examples of di- and polyamines include, but are not limited to, tris(aminophenyl)methane; bis(aminomethyl) norbornane; piperazine; ethylenediamine; diethylenetriamine; triethylenetetramine; tetraethylenepentamine; 1-(2-aminoethyl)piperazine; bis(aminopropyl)ether; bis(aminopropyl)sulfide; isophorone diamine; 1,2-diaminobenzene; 1,3-diaminobenzene; 1,4-diaminobenzene; 4,4'-diaminodiphenylmethane; 4,4'-diaminodiphenylsulfone; 2,2'-diaminodiphenylsulfone; 4,4'- diaminodiphenyl oxide; 3,3',5,5'-tetramethyl-4,4'-diaminodiphenyl; 3,3'-dimethyl-4,4'-diaminodiphenyl; 4,4'-diamino-alpha-methylstilbene; 4,4'-diaminobenzanilide; 4,4'-diaminostilbene; 1,4-bis(4-aminophenyl)-trans-cyclohexane; 1,1-bis(4-aminophenyl)cyclohexane; 1,2-diaminocyclohexane; 1,4-bis(aminocyclohexyl)methane; 1,3-bis(aminomethyl)cyclohexane; 1,4-bis(aminomethyl)cyclohexane; 1,4-cyclohexanediamine; 1,6-hexanediamine, 1,3-xylenediamine; 2,2'-bis(4-aminocyclohexyl)propane; 4-(2-aminopropan-2-yl)-1-methylcyclohexan-1-amine (menthane diamine); and any combination thereof.

Examples of primary monoamines include, but are not limited to, aniline; 4-chloroaniline; 4-methylaniline; 4-methoxyaniline; 4-cyanoaniline; 4-aminodiphenyl oxide; 4-aminodiphenylmethane; 4-aminodiphenyl sulfide; 4-aminobenzophenone; 4-amino-diphenyl; 4-aminostilbene; 4-amino-alpha-methylstilbene; methylamine; 4-amino-4'-nitrostilbene; n-hexylamine; cyclohexylamine; aminonorbornane; N,N-diethyltrimethylenediamine; 2,6-dimethylaniline; and any combination thereof. When ammonia is used as the reactive compound (B) of the present invention, the ammonia may be used in the form of liquified ammonia ($NH_3$) or ammonium hydroxide ($NH_4OH$).

Examples of sulfonamides include, but are not limited to, phenylsulfonamide; 4-methoxyphenylsulfonamide; 4-chlorophenylsulfonamide; 4-bromophenylsulfonamide; 4-methylsulfonamide; 4-cyanosulfonamide; 4-sulfonamidodiphenyl oxide; 4-sulfonamidodiphenylmethane; 4-sulfonamidobenzophenone; 4-sulfonylamidodiphenyl; 4-sulfonamidostilbene; 4-sulfonamido-alpha-methylstilbene; 2,6-dimethyphenylsulfonamide; and any combination thereof.

Examples of aminophenols include, but are not limited to, o-aminophenol; m-aminophenol; p-aminophenol; 2-methoxy-4-hydroxyaniline; 3-cyclohexyl-4-hydroxyaniline; 2,6-dibromo-4-hydroxyaniline; 5-butyl-4-hydroxyaniline; 3-phenyl-4-hydroxyaniline; 4-(1-(3-aminophenyl)-1-methylethyl)phenol; 4-(1-(4-aminophenyl)ethyl)phenol; 4-(4-aminophenoxy)phenol; 4-((4-aminophenyl)thio)phenol; (4-aminophenyl)(4-hydroxyphenyl)methanone; 4-((4-aminophenyl)sulfonyl)phenol; N-methyl-p-aminophenol; 4-amino-4'-hydroxy-alpha-methylstilbene; 4-hydroxy-4'-amino-alpha-methyl stilbene; 3,5-dimethyl-4-hydroxyaniline; 4-(1-(4-amino-3,5-dibromophenyl-1-methylethyl)-2,6-dibromophenol; and any combination thereof.

Examples of aminocarboxylic acids include, but are not limited to, 2-aminobenzoic acid; 3-aminobenzoic acid; 4-aminobenzoic acid; 2-methoxy-4-aminobenzoic acid; 3-cyclohexyl-4-aminobenzoic acid; 5-butyl-4-aminobenzoic acid; 3-phenyl-4-aminobenzoic acid; 4-(1-(3-aminophenyl)-1-methylethyl)benzoic acid; 4-(1-(4-aminophenyl)ethyl)benzoic acid; 4-(4-aminophenoxy)benzoic acid; 4-((4-aminophenyl)thio)benzoic acid; (4-aminophenyl)(4-carboxyphenyl)methanone; 4-((4-aminophenyl)sulfonyl)benzoic acid; N-methyl-4-aminobenzoic acid; 4-amino-4'-carboxy-alpha-methylstilbene; 4-carboxy-4'-amino-alpha-methylstilbene; glycine; N-methylglycine; 4-aminocyclohexanecarboxylic acid; 4-aminohexanoic acid; 4-piperidinecarboxylic acid; 5-aminophthalic acid; 3,5-dimethyl-4-aminobenzoic acid; 2,6-dibromo-4-aminobenzoic acid; 4-(1-(4-amino-3,5-dibromophenyl-1-methylethyl)-2,6-dibromobenzoic acid; and any combination thereof.

Examples of carboxylic acids include, but are not limited to, 2-hydroxybenzoic acid; 3-hydroxybenzoic acid; 4-hydroxybenzoic acid; 2-methoxy-4-hydroxybenzoic acid; 3-cyclohexyl-4-hydroxybenzoic acid; 5-butyl-4-hydroxybenzoic acid; 3-phenyl-4-hydroxybenzoic acid; 4-(1-(3-hydroxyphenyl-1-methylethyl)benzoic acid; 4-(1-(4-hydroxyphenyl)ethyl)benzoic acid; 4-(4-hydroxyphenoxy)benzoic acid; 4-((4-hydroxyphenyl)thio)benzoic acid; (4-hydroxyphenyl)(4-carboxyphenyl)methanone; 4-((4-hydroxyphenyl)sulfonyl)benzoic acid; 4-hydroxy-4'-carboxy-alpha-methyl stilbene; 4-carboxy-4'-hydroxy-alpha-methylstilbene; 2-hydroxyphenylacetic acid; 3-hydroxyphenylacetic acid; 4-hydroxyphenylacetic acid; 4-hydroxyphenyl-2-cyclo-hexanecarboxylic acid; 4-hydroxyphenoxy-2-propanoic acid; 4-(1-(4-hydroxy-3,5-dibromophenyl-1-methylethyl)-2,6-dibromobenzoic acid; 3,5-dimethyl-4-hydroxybenzoic acid; 2,6-dibromo-4-hydroxybenzoic acid; and any combination thereof.

Examples of sulfanilamides include, but are not limited to, o-sulfanilamide; m-sulfanilamide; p-sulfanilamide; 2-methoxy-4-aminobenzoic acid; 3-methyl-4-sulfonamido-1-aminobenzene; 5-methyl-3-sulfonamido-1-aminobenzene; 3-phenyl-4-sulfonamido-1-aminobenzene; 4-(1-(3-sulfonamidophenyl-1-methyl-ethyl)aniline; 4-(1-(4-sulfonamidophenyl)ethyl)aniline; 4-(4-sulfonamidophenoxy)aniline; 4-((4-sulfonamidophenyl)thio)aniline; (4-sulfonamidophenyl)(4-aminophenyl)methanone; 4-((4-sulfonamidophenyl)sulfonyl)aniline; 4-sulfonamido-1-N-methylaminobenzene; 4-amino-4'-sulfonamido-alpha-methylstilbene; 4-sulfonamido-4'-amino-alpha-methylstilbene; 4-(1-(4-sulfonamido-3,5-dibromophenyl)-1-methylethyl)-2,6-dibromo-aniline; 2,6-dimethyl-4-sulfonamido-1-aminobenzene; and any combination thereof.

According to another aspect, there is provided an adduct comprising the reaction product of (A) the residual epoxy oligomer product above; (B) the reactive compound described above; and (C) an epoxy resin compound, where the epoxy resin compound (C) comprises one or more epoxy resins other than the epoxy oligomer compounds (II)-(VI).

The epoxy resin which can be used as the epoxy resin compound (C) may be any epoxide-containing compound which has an average of more than one epoxide group per molecule. The epoxide-containing compounds which can be used as the epoxy resin compound (C) herein include, but are not limited to, those selected from the group consisting of aromatic epoxy resins, alicyclic epoxy resins, aliphatic epoxy resins, and combinations thereof.

Examples of aromatic epoxy resins include, but are not limited to, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl)methane), 1,1,2,2-tetra(4-hydroxyphenyl)ethane, tetrabromobisphenol A, 2,2-bis(4-hydroxyphenyl)-1,1,1,3,3,3-hexafluoropropane, 1,6-dihydroxynaphthalene, and combinations thereof.

Examples of alicyclic epoxy resins include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to, hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane;

dicyclopentadiene diepoxide; ethylene-bis(3,4-epoxycyclohexane carboxylate); dioctyl epoxyhexahydrophthalate; di-2-ethylhexyl epoxyhexahydrophthalate; and combinations thereof.

Examples of aliphatic epoxy resins include, but are not limited to, polyglycidyl ethers of aliphatic polyols or alkylene-oxide adducts thereof; polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; diglycidyl esters of aliphatic long-chain dibasic acids; and combinations thereof.

As described above, the adduct of the present disclosure is a reaction product of the residual epoxy oligomer product, component (A), a reactive compound, component (B) and, optionally, an epoxy resin compound comprising one or more epoxy resins other than the epoxy oligomer compounds of formulae (II)-(VI), component (C).

According to one aspect, a sufficient amount of the residual epoxy oligomer product (A) and the epoxy resin compound (C), if used, and an excess amount of the reactive compound (B) are provided in a reaction mixture to form the adduct of the present disclosure. At the end of the reaction for forming the adduct of the present disclosure, essentially all of the epoxide groups in the epoxy oligomer compounds (II)-(VI) are reacted with reactive hydrogen atoms in the reactive compound (B). The unreacted reactive compound (B) may be removed at the end of the reaction or may remain as a part of the adduct product.

In general, the ratio of the reactive compound (B) and the residual epoxy oligomer product (A) is from about 2:1 to about 100:1, or from about 3:1 to about 60:1, or even from about 4:1 to about 40:1 equivalents of the reactive hydrogen atom in the reactive compound (B) per equivalent of epoxide group in the residual epoxy oligomer product (A) and epoxy resin compound (C), if used.

One or more optional solvents may be present in the adduct forming reaction of the present disclosure. The presence of a solvent or solvents can improve the solubility of the reactants and may also dilute the concentration of the reactants in order to moderate the adduct forming reaction such as to control heat generated from the adduct forming reaction or to lower the effective concentration of a reactant which can in turn influence the structure of the adduct product, for example, produce an adduct with less oligomeric component derived from the adduct forming reaction.

The solvent may be any solvent which is substantially inert to the adduct forming reaction including inert to the reactants, the intermediate products if any, and the final products. Examples of suitable solvents include, but are not limited to, aliphatic, cycloaliphatic and aromatic hydrocarbons, halogenated aliphatic and cycloaliphatic hydrocarbons, aliphatic and cycloaliphatic secondary alcohols, aliphatic ethers, aliphatic nitriles, cyclic ethers, glycol ethers, esters, ketones, amides, sulfoxides, and any combination thereof.

Particular examples of the solvents include, but are not limited to, pentane, hexane, octane, cyclohexane, methylcyclohexane, toluene, xylene, methylethylketone, methylisobutylketone, cyclohexanone, dimethylsulfoxide, diethyl ether, tetrahydrofuran, 1,4-dioxane, dichloromethane, chloroform, ethylene dichloride, methyl chloroform, ethylene glycol dimethyl ether, acetonitrile, isopropanol, N,N-dimethylacetamide, N,N-dimethylformamide and any combination thereof.

The solvent may be removed at the completion of the adduct reaction using conventional means, such as, for example, vacuum distillation. Alternatively, the solvent may also be left in the adduct product to provide a solvent borne adduct which may be used later, for example, in the preparation of a coating or film.

The adduct forming reaction conditions may vary depending upon factors such as types and amounts of reactants employed, amount of solvent used, if any, and modes of addition of the reactants employed.

For example, the adduct forming reaction may be conducted at atmospheric (e.g., 760 mm Hg), superatmospheric or subatmospheric pressures and at temperature of from about 0° C. to about 200° C., or from about 20° C. to about 150° C., or even from about 60° C. to about 100° C.

The time required to complete the adduct forming reaction depends not only upon the aforementioned factors, but also upon the temperature employed. Higher temperatures require a shorter period of time, whereas lower temperatures require a longer period of time. In general, the time to complete the adduct reaction is preferred to be from about 5 minutes to about 12 hours, or from about 15 minutes to about 6 hours, or even from about 30 minutes to 1.5 hours.

In carrying out the adduct forming reaction, the residual epoxy oligomer product (A) may be directly mixed together with the reactive compound (B), added to the reactive compound (B) in incremental steps, or added to the reactive compound (B) continuously. In addition, one or more solvents may be first added to the residual epoxy oligomer product (A) and/or the reactive compound (B) before mixing the residual epoxy oligomer product (A) and the reactive compound (B).

If incremental addition of the residual epoxy oligomer product (A) is used, all or a part of an added increment may be allowed to react prior to addition of the next increment. The incremental addition of the residual epoxy oligomer product (A) reacted with an excess amount of the reactive compound (B) generally favors the formation of the adduct with a lesser amount or free of oligomeric components derived from the adduct forming reaction.

According to another aspect, the adduct may be used as a curing agent to cure a curable resin. Thus, there is also provided a curable system containing a curable resin and the adduct of the present disclosure.

In one aspect, the curable resin is an epoxy compound. In general, any epoxy compound is suitable for use in the present disclosure, such as the epoxy compounds disclosed in U.S. Pat. No. 5,476,748 which is incorporated herein by reference. The epoxy compound may be solid or liquid. In particular, the epoxy compound is selected from the group of: a polyglycidyl epoxy compound; a non-glycidyl epoxy compound; an epoxy cresol novolac compound; and an epoxy phenol novolac compound and a mixture thereof.

The polyglycidyl epoxy compound may be a polyglycidyl ether, poly(β-methylglycidyl) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis(2-hydroxyethyl)aniline or p,p'-bis(2-hydroxyethylamino) diphenylmethane.

Particularly important representatives of polyglycidyl ethers or poly(β-methylglycidyl)ethers are based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)sulfone (Bisphenol S), alkoxylated Bisphenol A, F or S, triol extended Bisphenol A, F or S, brominated Bisphenol A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(P-methylglycidyl)esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, may be used.

In another aspect, the epoxy compound is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups.

Particularly suitable non-glycidyl epoxy compounds include the following difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl.

Highly preferred difunctional non-glycidyl epoxies include cycloaliphatic difunctional non-glycidyl epoxies, such as 3,4-epoxycyclohexyl-methyl 3',4'-epoxycyclohexanecarboxylate and 2,2'-bis-(3,4-epoxy-cyclohexyl)-propane, with the former being most preferred.

In another embodiment, the epoxy compound is a poly (N-glycidyl) compound or poly(S-glycidyl) compound. Poly (N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl) methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl)ether.

It is also possible to employ epoxy compounds in which the 1,2-epoxide groups are attached to different heteroatoms or functional groups. Examples include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5, 5-dimethyl-1-glycidylhydantoin-3-yl)propane.

Other epoxide derivatives may also be employed, such as vinyl cyclohexene dioxide, limonene dioxide, limonene monoxide, vinyl cyclohexene monoxide, 3,4-epoxycyclohexylmethyl acrylate, 3,4-epoxy-6-methyl cyclohexylmethyl 9,10-epoxystearate, and 1,2-bis(2,3-epoxy-2-methylpropoxy)ethane.

The curable system of the present disclosure may be prepared by mixing the adduct of the present disclosure with the curable resin in amounts which will effectively cure the curable resin, with the understanding that the amounts will depend upon the specific adduct and the curable resin employed. Generally, the ratio of the equivalents of reactive hydrogen atoms present in the adduct per equivalent of epoxide group in the curable resin ranges from about 0.60:1 to about 1.50:1, or from about 0.95:1 to about 1.05:1 at the conditions employed for curing.

In another aspect, there is provided a two component system that includes a first component Part (1), housed in a first container including the curable resin and a second component Part (2), housed in a second container including the adduct of the present disclosure. Parts (1) and (2) of this two component system are stable under standard storage conditions and Part (1) may be mixed with Part (2) before application and curing. The curable system and Parts (1) and/or (2) may also include a curing agent, catalyst, toughener stabilizer, plasticizer, cure accelerator, extender, filler, reinforcing agent, pigment, dyestuff, tackifier, diluent or any mixture thereof.

Examples of the curing agent and/or catalyst useful for the curable resin include aliphatic, cycloaliphatic, polycycloaliphatic or aromatic primary monoamines, aliphatic, cycloaliphatic, polycycloaliphatic or aromatic primary and secondary polyamines, carboxylic acids and anhydrides thereof, aromatic hydroxyl containing compounds, imidazoles, guanidines, urea-aldehyde resins, melamine-aldehyde resins, alkoxylated urea-aldehyde resins, alkoxylated melamine-aldehyde resins, amidoamines or any combination thereof.

Particular examples of the curing agent include methylenedianiline, dicyandiamide, ethylenediamine, diethylenetriamine, triethyl ene-tetramine, tetraethylenepentamine, urea-formaldehyde resins, melamine-formaldehyde resins, methylolated urea-formaldehyde resins, methylolated melamine-formaldehyde resins, phenol-formaldehyde novolac resins, cresol-formaldehyde novolac resins, sulfanilamide, diaminodiphenylsulfone, diethyltoluenediamine, t-butyl-toluenediamine, bis-4-aminocyclo-hexylamine, bis(aminomethyl)norbornane, isophoronediamine, diaminocyclohexane, hexamethylenediamine, piperazine, 1-(2-aminoethyl)piperazine, 4,4'-diaminostilbene; 4,4'-diamino-alpha-methylstilbene; 4,4'-diaminobenzanilide; 2,5-dimethyl-2,5-hexane-diamine; 1,12-dodecanediamine; tris-3-aminopropylamine; 1,3-xylenediamine; 2,2'-bis(4-aminocyclohexyl)propane; 4-(2-aminopropan-2-yl)-1-methylcyclohexan-1-amine (menthane diamine) and any combination thereof.

Particular examples of the catalyst include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, metallic acylates such as stannous octoate or zinc octoate, and any combination thereof.

The curing agent may be employed in conjunction with the adduct to cure the curable resin. The amounts of combined curing agent and adduct are from about 0.60:1 to about 1.50:1, or from about 0.95:1 to about 1.05:1 equivalents of reactive hydrogen atom collectively in the curing agent and the adduct.

The catalyst may be employed in an amount which will effectively cure the curable epoxy resin composition. The amount of the curing catalyst will also depend upon the particular adduct, epoxy resin, and curing agent, if any, employed in the curable epoxy resin composition. Generally, the catalyst may be used in an amount of from about 0.001% by weight to about 2% by weight, based on the total weight the curable system.

Stabilizers which may be employed include: phenothiazine itself or C-substituted phenothiazines having 1 to 3 substituents or N-substituted phenothiazines having one substituent, for example, 3-methyl-phenothiazine, 3-ethyl-phenothiazine, 10-methyl-phenothiazine; 3-phenyl-phenothiazine, 3,7-diphenyl-phenothiazine; 3-chlorophenothiazine, 2-chlorophenothiazine, 3-bromophenothiazine; 3-nitrophenothiazine, 3-aminophenothiazine, 3,7-diaminophenothiazine; 3-sulfonyl-phenothiazine, 3,7-disulfonyl-phenothiazine, 3,7-dithiocyanatophenthiazin; substituted quinines and catechols, copper naphthenate, zinc-dimethyldithiocarbonate and phosphotungistic acid hydrate. Extenders, reinforcing agents, fillers and pigments which can be employed include, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, eugenol, dicummyl peroxide, isoeugenol, carbon black, graphite, and iron powder. It is also possible to add other additives, for example, flameproofing agents, flow control agents such as silicones, cellulose acetate butyrate, polyvinyl butyrate, waxes and stearates.

In another aspect, the present disclosure provides a method of forming a coating. The method includes applying the curable system to a substrate, and subjecting the curable system to curing conditions to cure the curable system and form a coating, such curing conditions being either under ambient conditions and/or under heat.

The expression "cured" as used herein, denotes the conversion of the curable resin and adduct mixture into an insoluble and infusible crosslinked product, with simultaneous shaping to give a shaped article such as a molding, pressing or laminate or to give a two-dimensional structure such as a coating, enamel, or adhesive bond. Typical curing processes include ambient temperature cure to elevated temperature cure using thermal, radiation or a combination of energy sources. The curable system may be cured in one step or multiple steps such as A, B staged cures often practiced in the electrical laminates and composites industries. Or, the curable system may be post-cured using a different temperature or energy source after the initial cure cycle.

Accordingly, the present disclosure also provides a cured product obtained by contacting any suitable substrate with the curable system and curing the curable system using thermal, radiation or a combination of energy sources. In one embodiment, the resin coated substrate may be thermally cured by applying heat to the curable system at a temperature of from about 120° C. to about 170° C., or from about 130° C. to about 160° C., for a period of time from about 1 minute to about 300 minutes, or from about 45 minutes to about 150 minutes. Optionally, molded forms of the cured product may be further post-cured at a temperature of from about 120° C. to about 250° C. for a period of time from about 30 minutes to about 12 hours under vacuum. In one particular aspect, the curable system may be cured by heating the curable system at a temperature of between about 120° C.-125° C. for about 0.5-1 hour, followed by heating and curing at a temperature of between about 135° C.-145° C. for about 1.5-2 hours which is then followed by heating and curing the curable system at a temperature of between about 145° C.-155° C. for about 0.5-1.5 hours.

In addition, the curable system of the present disclosure may be used in methods for bonding one or more substrates together by contacting one or more surfaces of like or dissimilar substrates to be bonded with the curable system under conditions sufficient to cure the curable system. Such conditions are those generally used in currently known processes practiced by one skilled in the art and may include application of pressure and/or heat.

As noted above, the curable system is suitable for use as a coating, adhesive, sealant, and matrice for the preparation of reinforced composite material, such as prepregs and towpregs, and can also be used in injection molding or extrusion processes.

Thus, in another aspect, the present disclosure provides an adhesive, sealant, coating or encapsulating system for electronic or electrical components comprising the curable system of the present disclosure. Suitable substrates on which the coating, sealant, adhesive or encapsulating system comprising the curable system may be applied include metal, such as steel, aluminum, titanium, magnesium, brass, stainless steel, galvanized steel; silicates such as glass and quartz; metal oxides; concrete; wood; electronic chip material, such as semiconductor chip material; or polymers, such as polyimide film and polycarbonate. The adhesive, sealant or coating comprising the curable system may be used in a variety of applications, such as in industrial or electronic applications.

In another aspect, the present disclosure provides a cured product comprising bundles or layers of fibers infused with the curable system.

In yet another aspect, the present disclosure provides a method for producing a prepreg or towpreg including the steps of (a) providing a bundle or layer of fibers; (b) providing a curable system of the present disclosure; (c) joining the bundle or layer of fibers and curable system to form a prepreg or towpreg assembly; (d) optionally removing excess curable system from the prepreg or towpreg assembly, and (e) exposing the prepreg or towpreg assembly to elevated temperature and/or pressure conditions sufficient to infuse the bundle or layer of fibers with the curable system and form a prepreg or towpreg.

In some aspects, the bundle or layer of fibers may be constructed from unidirectional fibers, woven fibers, chopped fibers, non-woven fibers or long, discontinuous fibers. The fibers may be selected from glass, such as S glass, S2 glass, E glass, R glass, A glass, AR glass, C glass, D glass, ECR glass, glass filament, staple glass, T glass and zirconium glass, carbon, polyacrylonitrile, acrylic, aramid, boron, polyalkylene, quartz, polybenzimidazole, polyetherketone, polyphenylene sulfide, poly p-phenylene benzobisoxazole, silicon carbide, phenolformaldehyde, phthalate and naphthenoate.

The curable system and prepregs or towpregs prepared therefrom are particularly useful in the manufacture and assembly of composite parts for aerospace and automotive applications, bonding of composite and metal parts, core and core-fill for sandwich structures and composite surfacing.

EXAMPLES

Example 1

To a 500-mL, 4-neck, round-bottom reaction flask equipped with a mechanical stirrer, nitrogen gas inlet, thermocouple with a temperature controller, cold water condenser, and an addition funnel was charged 181.1 g (6.4 amine-H equivalents) of 1,2-diaminocyclohexane (DACH). The flask was then purged with nitrogen gas and stirred. The DACH was then heated to 70° C. During this time a residual epoxy oligomer product, in a frozen state, was gently heated to approximately 80° C. in an oven. Using the addition funnel, 118.9 g (0.62 epoxy equivalents) of the heated residual epoxy oligomer product was added to the 500-mL flask slowly to avoid raising the flask temperature above 90° C. After the residual epoxy oligomer addition was completed, the mixture was allowed to react for approximately 1 hour at 70°-80° C. The flask was then cooled, and the adduct product was discharged. The adduct was a clear brown liquid having a viscosity of 61,000 cP at 70° C. and an amine-H equivalent weight of 52.3 g/eq.

Example 2

Using the same reaction equipment as was used in Example 1, 189.4 g (3.6 amine-H equivalents) of 4,4'-methylenebis(cyclohexylamine)(PACM) was added and the flask was purged with nitrogen gas during stirring. The PACM was then heated to 80° C. During this time the residual epoxy oligomer product, in a frozen state, was gently heated to approximately 80° C. in an oven. Using the addition funnel, 51.0 g (0.30 epoxy equivalents) of the heated residual epoxy oligomer product was added to the 500-mL flask slowly to avoid raising the flask temperature above 90° C. After the residual epoxy oligomer product addition was completed, the mixture was allowed to react for approximately 1 hour at 80° C. The flask was then cooled, and the adduct product was discharged. The adduct was a clear amber liquid having a viscosity of 38,600 cP at 60° C. and an amine-H equivalent weight of 72.8 g/eq.

Example 3

Using the same reaction equipment as was used in Example 1, 297.0 g (6.0 amine-H equivalents) of cyclohexylamine (CHA) was added and the flask was purged with nitrogen gas during stirring. The CHA was then heated to 75° C. During this time the residual epoxy oligomer product, in a frozen state, was gently heated to approximately 80° C. in an oven. Using the addition funnel, 149.4 g (0.87 epoxy equivalents) of the heated residual epoxy oligomer product was added to the 500-mL flask slowly to avoid raising the flask temperature above 90° C. After the addition of the residual epoxy oligomer was completed, the mixture was allow to react for 30-60 minutes at 75° C. The reaction product was then distilled under vacuum (at a max. temperature of 100° C.) to remove the excess CHA. The flask was then cooled to 90° C. and the adduct product was discharged onto a foil plate. The resulting adduct was a clear, dark amber, brittle solid having an amine-H equivalent weight of 175.3 g/eq.

Although making and using various embodiments of the present disclosure have been described in detail above, it should be appreciated that the present disclosure provides many applicable inventive concepts that can be embodied in a wide variety of specific contexts. The specific embodiments discussed herein are merely illustrative of specific ways to make and use the invention, and do not delimit the scope of the invention.

The invention claimed is:

1. An adduct comprising the reaction product of:
   (A) a residual epoxy oligomer product and
   (B) a reactive compound having two or more reactive hydrogen atoms per molecule,
   wherein the residual epoxy oligomer product comprises one or more epoxy oligomer compounds having formulae (III) to (VI):

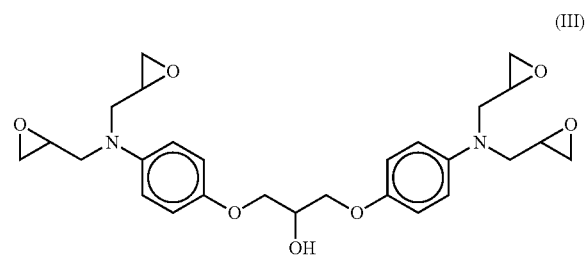

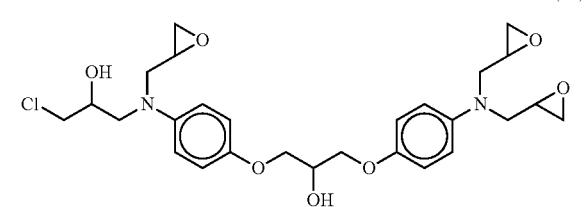

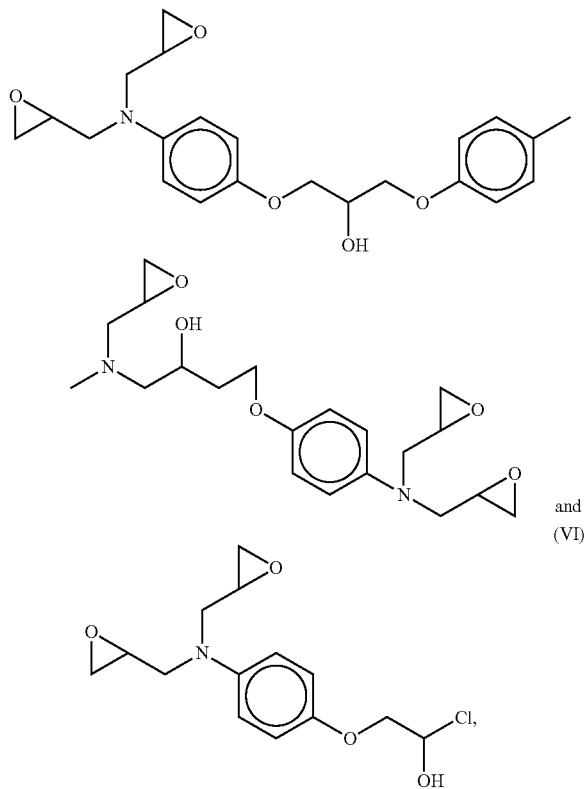

and
wherein the residual epoxy oligomer product contains no more than 10 percent by weight of triglycidyl p-aminophenol.

2. The adduct of claim 1, wherein the residual epoxy oligomer product comprises an epoxy oligomer compound having the formula (III) in an amount ranging between about 35% by weight to about 70% by weight, based on the total weight of the residual epoxy oligomer product.

3. The adduct of claim 1, wherein the residual epoxy oligomer product comprises an epoxy oligomer compound having the formula (IV) in an amount ranging between about 1% by weight to about 20% by weight, based on the total weight of the residual epoxy oligomer product.

4. The adduct of claim 1, wherein the residual epoxy oligomer product comprises an epoxy oligomer compound having the formula (V) in an amount ranging between about 1% by weight to about 20% by weight, based on the total weight of the residual epoxy oligomer product.

5. The adduct of claim 1, wherein the residual epoxy oligomer product comprises an epoxy oligomer compound having the formula (VI) in an amount less than 3% by weight, based on the total weight of the residual epoxy oligomer product.

6. The adduct of claim 1, wherein the residual epoxy oligomer product further comprises an epoxy oligomer compound having a molecular weight greater than about 750 g/mol in an amount of less than 10% by weight, based on the total weight of the epoxy oligomer product.

7. The adduct of claim 1, wherein the reactive compound (B) is selected from a diamine, a polyamine, a primary monoamine and a mixture thereof.

8. A curable system comprising a curable resin and the adduct of claim 1.

9. A two component system comprising a first component housed in a first container including a curable resin and a second component housed in a second container including the adduct of claim 1.

10. A process for preparing an adduct comprising reacting:
(A) a residual epoxy oligomer product with
(B) a reactive compound having two or more reactive hydrogen atoms per molecule
wherein the residual epoxy oligomer product comprises one or more epoxy oligomer compounds having formulae (III) to (VI):

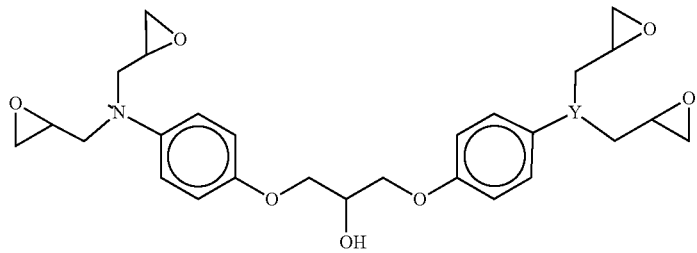

(III)

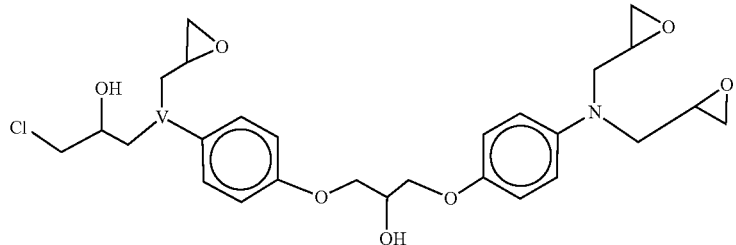

(IV)

-continued

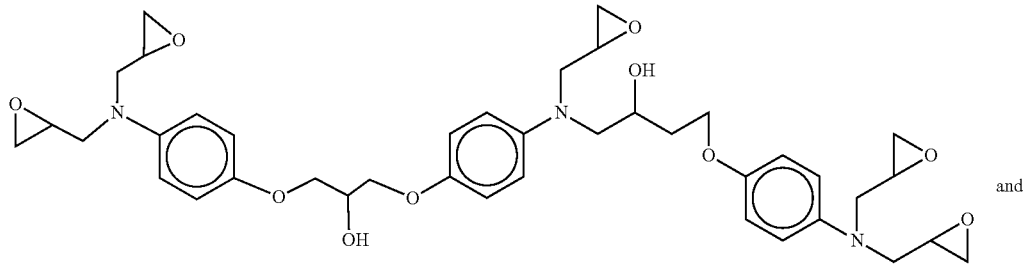
(V)

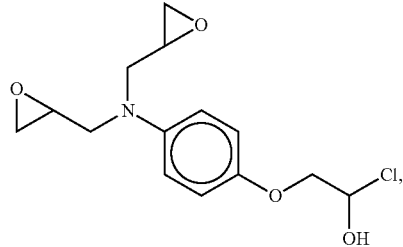
and
(VI)

and
wherein the residual epoxy oligomer product contains no more than 10 percent by weight of triglycidyl p-aminophenol.

11. An adduct comprising the reaction product of:
(A) a residual epoxy oligomer product and
(B) a reactive compound having two or more reactive hydrogen atoms per molecule,
wherein the residual epoxy oligomer product comprises one or more epoxy oligomer compounds having formulae (III) to (VI):

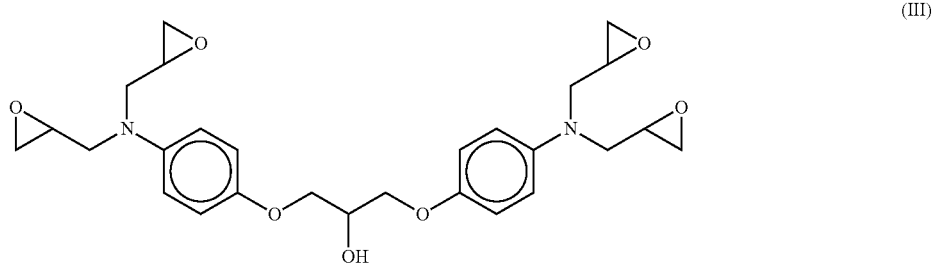
(III)

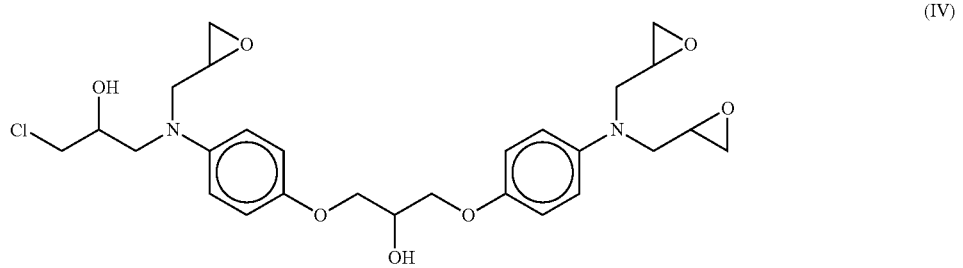
(IV)

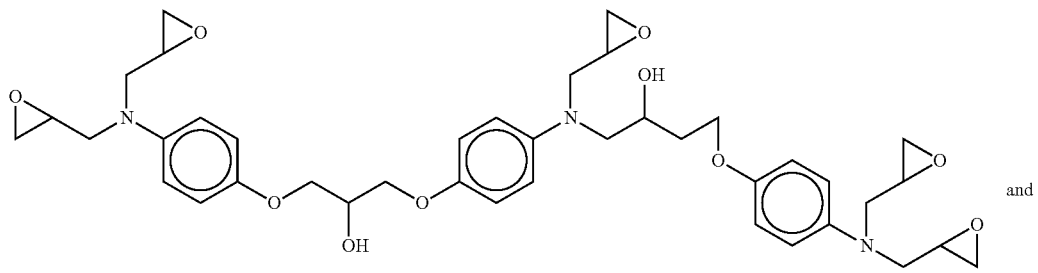
(V)
and
(VI)
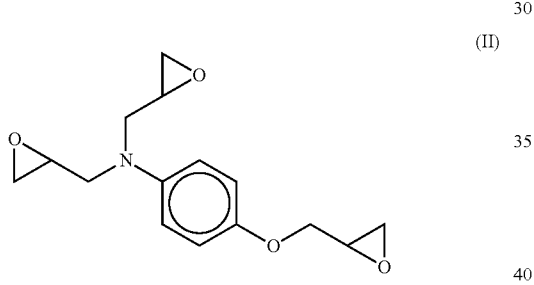
and
wherein the residual epoxy oligomer product further comprises an epoxy oligomer compound having the formula (II)
(II)
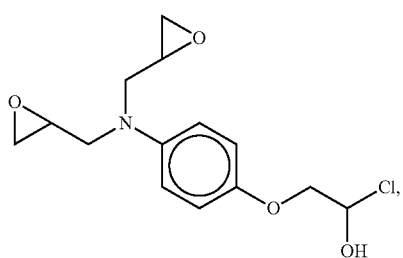
wherein the epoxy compound having formula (II) is present in the residual epoxy oligomer product in an amount ranging between about 10% by weight to about 35% by weight, based on the total weight of the residual epoxy oligomer product.
* * * * *